Patented Dec. 8, 1942

2,304,729

UNITED STATES PATENT OFFICE 2,304,729

PHENOLIC AMIDO RESIN

Herman A. Bruson, Philadelphia, Pa., assignor to The Resinous Products & Chemical Company, Philadelphia, Pa.

No Drawing. Application January 4, 1940, Serial No. 312,338

17 Claims. (Cl. 260—47)

This invention relates to new resinous materials and to the process by which they are prepared. It relates more particularly to a novel type of resinous reaction product obtained by heating the anhydride of a polycarboxylic acid with a tertiary aminomethyl phenol or a carboxylic acid salt or ester thereof.

Tertiary aminomethyl phenols may be obtained by condensing a phenol having a reactive hydrogen atom in ortho or para position with respect to the hydroxyl group, with a suitable aldehyde, such as formaldehyde and a secondary non-aromatic amine as is described in United States Patents Nos. 2,031,557, 2,033,092, 2,040,039, 2,040,040, and 2,098,869.

It has been found that, when these tertiary aminomethyl phenols, their carboxylic acid salts or esters are heated with the anhydride of a polycarboxylic acid containing at least four carbon atoms, resinous products are obtained. The reaction is carried out at temperatures above about 100° C. but below the decomposition temperature of reactants or products, preferably between 120 and 200° C. The tertiary aminomethyl phenol (or its salt or ester) and the anhydride of the acid may be heated alone or they may be dissolved in an inert solvent having a sufficiently high boiling point such as xylene or tetralin. The properties of the resins thus obtained may be varied over a wide range depending on the particular acid anhydride and tertiary aminomethyl phenol employed.

A great many so-called "methylol-forming phenols" may be condensed with an aldehyde and a secondary non-aromatic amine in preparing the starting materials for the present invention. These include phenol, α- or β-naphthol, cresols, phenyl phenols, cyclohexyl phenols, p-ter.butyl phenol, hydroxy diphenyl methanes, hydroxy diphenyl sulfones, hydroxy benzophenone, etc. Secondary non-aromatic amines which may be employed include dimethylamine, methylethylamine, diethylamine, dibutylamine, diallylamine, dimethallylamine, methyloctylamine, methyldodecylamine, and other dialkyl amines, diethanolamine, N-methylcyclohexylamine, dicyclohexylamine, piperidine, morpholine, pyrrolidine, etc. One mol of the phenol may be condensed with one mol each of the secondary amine and aldehyde to yield compounds containing one tertiary aminomethyl group or, if the phenol has more than one reactive nuclear hydrogen atom, two or more mols of the secondary amine and aldehyde may be employed to yield compounds having the corresponding number of tertiary aminomethyl groups. Non-aromatic secondary diamines such as piperazine and N,N'-dimethyl-decamethylenediamine-1,10 may also be employed in which case either one or two mols of the phenol and aldehyde may be condensed with one mol of the diamine.

Formaldehyde, or other suitable aldehyde such as glyoxal, or benzaldehyde, may be used in preparing the tertiary aminomethyl phenols.

Typical tertiary aminomethyl phenols which may be used are:

2-hydroxybenzyl-N-dimethylamine
2-hydroxybenzyl-N-diallylamine
2-hydroxybenzyl-N-dibutylamine
2-hydroxybenzyl-N-piperidine
2-hydroxybenzyl-N-pyrrolidine
2-hydroxybenzyl-N-benzylmethylamine
2-hydroxybenzyl-N-dicyclohexylamine
2-hydroxybenzyl-N-morpholine
2-hydroxybenzyl-N-diethanolamine
2-hydroxybenzyl-N-methyloctylamine
2-hydroxybenzyl-N-methyldodecylamine
2-hydroxy-5-butylbenzyl-N-dimethylamine
2-hydroxy-4,6-dimethylbenzyl-N-dimethylamine
Bis-(2-hydroxy -5- butylbenzyl -N- methyl)-decamethylene diamine-1,10
Bis-2-(hydroxybenzyl)-N,N'-piperazine
1-(dimethylaminomethyl)-2-naphthol
1-(morpholinomethyl)-2-naphthol
1-(α-dimethylaminobenzyl)-2-naphthol
1-(α-piperidinobenzyl)-2-naphthol
3 -(dimethylaminomethyl)- 4,4' - dihydroxydiphenylsulfone
3 - (dimethylaminomethyl) - 4,4' - dihydroxydiphenylketone
2,5-di(dimethylaminomethyl)-hydroquinone
2,4,6-tri-(dimethylaminomethyl)-phenol
3,5,3',5' - tetra(dimethylaminomethyl)- 4,4'- dihydroxydiphenyl-β-propane.

The aromatic nucleus of the phenolic amines used may contain substituents other than those shown above, such as alkyl, aryl, aralkyl, cycloalkyl, hydroxyalkyl, alkoxy, aryloxy, carboxy, carbalkoxy, halogen, nitro, acyl or acylamino radicals.

The anhydrides of polycarboxylic acids which may be used to react with the tertiary aminomethyl phenols include compounds from the aliphatic, aromatic, hydroaromatic, and heterocyclic series, particularly good results being obtained with phthalic, hexahydrophthalic, succinic, glutaric, adipic, azelaic, sebacic, and pyromellitic anhydrides. Darker resins are obtained with maleic, citraconic and furoic anhydrides. Furthermore, there may be used as the acid anhydride the so-called "Diels-Alder adducts" of maleic anhydride with other unsaturated compounds, such as abietic acid, abietic acid esters, styrene, indene, vinyl acetate, vinyl ethers, acrylic acid esters, methacrylic acid esters, terpenes, drying oils, drying oil fatty acids, castor oil, etc., which adducts possess at least one polycarboxylic acid anhydride group. It is not always necessary to employ the anhydride of the acid as the acids themselves may be used provided that they are readily dehydrated to the anhydride by heating to the temperatures employed in the process described here. Furthermore, two or more acid anhydrides may be employed with one tertiary aminomethyl phenol or a mixture of tertiary aminomethyl phenols may be employed with one or more acid anhydrides. When the tertiary aminomethyl phenol contains more than one tertiary aminomethyl group, one of them may be neutralized with a monobasic or polybasic carboxylic acid prior to reacting with the polybasic acid anhydride. Likewise, when mixtures of two tertiary aminomethyl phenols are employed, the amino group of one of them may be neutralized with a monocarboxylic or polycarboxylic acid. Suitable acids for this purpose are stearic, palmitic, oleic, hydroxystearic, acrylic, crotonic, methacrylic, sorbinic, undecylenic, lactic, elaeostearic, linolic, linoleic, octadecadienic, naphthenic, abietic, lauric, montanic, benzoyl benzoic, phenoxyacetic acids, or polybasic acids such as adipic, azelaic, sebacic, or phthalic acids. The resinous character of the final products may also be modified by heating them with monobasic acids such as abietic, linseed oil fatty acids, etc.

The reaction between the tertiary aminomethyl phenol and the anhydride of the dibasic acid is generally carried out by mixing the reactants in the proportion of one mol of the anhydride for each aminomethyl group in the tertiary aminomethyl phenol and heating to temperatures between 120 and 200° C. until the reaction is complete. The resulting product is usually a pale amber-colored resin.

When the tertiary aminomethyl phenol contains nuclear alkyl substituents, the final products tend to become soluble in hydrocarbons, whereas when these substituents are absent, the final products are soluble in alcohol. Those tertiary aminomethyl phenols which contain more than one tertiary aminomethyl group yield harder resins when reacted with the polycarboxylic acid anhydride than do the phenolic amines which contain only one such group. If the aryl nucleus carries more than one phenolic hydroxyl group, the products may be rendered insoluble by prolonged heating.

When the proportion of reactants indicated above is employed, the product contains free phenolic hydroxy groups which may be esterified by heating with mono- or poly-carboxylic acids or their anhydrides. In the case of the polycarboxylic acid, this esterification may be brought about by using an excess of the acid anhydride in the original reaction mixture. In case a dialkanolamine, such as diethanolamine, is employed in making the tertiary aminomethylphenol, the alcoholic hydroxyl groups of the resulting product may also be esterified by heating with mono- or poly-carboxylic acids or anhydrides. Alternatively, the tertiary aminomethyl phenol may be esterified at the phenolic hydroxy group prior to reacting it with the polycarboxylic acid anhydride as described in copending application Serial No. 240,009 filed November 12, 1938, now Patent No. 2,218,739. The products obtained from the esterified aminomethyl phenols are somewhat softer and more readily soluble in hydrocarbons than those obtained from the unesterified ones.

When the products contain replaceable hydrogen atoms in the ortho or para position with respect to the phenolic hydroxyl group, they may be condensed with formaldehyde in acid, neutral, or alkaline solution to yield resins which are much harder than the initial product.

The term "phenolic radical" is here used to describe aromatic groups possessing free nuclear hydroxyl groups or phenolic ester groups which are capable of being hydrolyzed to hydroxyl groups. The phenolic radical may possess one or more benzene rings. In the latter case they may be joined directly together, as in naphthol, phenyl phenol, hydroxyphenanthrene, hydroxyanthracene, etc., or through a bridge of sulfur, oxygen or carbon, as in p,p'-dihydroxydiphenylsulfoxide, -sulfide, or -sulfone, 4,4'-dihydroxydiphenyl ether, or p,p'-dihydroxydiphenyl methane, etc.

The following examples are illustrative of the general process which has been described. The parts shown are by weight.

Example 1

A mixture of 148 parts of phthalic anhydride and 151 parts of o-hydroxybenzyl-N-dimethylamine is heated at 130–140° C. for three hours in an open container while stirring constantly. The product obtained is a clear, pale yellow resin, melting at about 50° C. It is permanently fusible and soluble in methanol or ethanol but not in hydrocarbons. It is insoluble in cold 5% sodium carbonate, ammonium hydroxide, or hydrochloric acid solutions but dissolves readily in cold 5% sodium hydroxide solution.

Example 2

A mixture of 444 parts (3 mols) of phthalic anhydride and 248 parts (1 mol) of 2,4,6-tri-(dimethylaminomethyl)-phenol is heated and stirred in an atmosphere of nitrogen for three and one-half hours at 130–135° C. The resin obtained is a pale reddish, hard, brittle mass which is soluble in alcohol and can be heated for many hours without increasing in viscosity.

The tri-(dimethylaminomethyl)-phenol used is a colorless oil, B. P. 130–135° C./1 mm., obtainable by condensing one mol of phenol with three mols each of formaldehyde and dimethylamine.

Example 3

A mixture of 148 parts of phthalic anhydride and 207 parts of 5-tertiary-butyl-2-hydroxybenzyl-N-dimethylamine is heated in an atmosphere of carbon dioxide at 140–145° C. for two and one-half hours with constant stirring. A clear, pale yellow, hard, brittle resin is obtained which is soluble in alcohol, acetone, ethyl acetate and hot benzene. It is insoluble in cold 10% sodium hydroxide solution, or in ammonia. The alcoholic solution may be used as a varnish. The 5-tertiary-butyl-2-hydroxybenzyl-N-dimethylamine is a colorless oil, B. P. 100–110° C./1–2 mm., obtainable by heating one mol equivalent each of dimethylamine, formaldehyde, and p-ter.butyl-phenol at 90° C. for three hours. If dibutylamine or a higher dialkylamine is used in place of the di-methylamine in preparing the tertiary aminomethyl phenol, the final resin obtained by heating this aminomethyl phenol with phthalic anhydride as described above is soluble in petroleum hydrocarbons and drying oils.

Example 4

A mixture of 148 parts of phthalic anhydride and 263 parts of 5-tertiary-octyl-2-hydroxybenzyl-N-dimethylamine is heated at 140–145° C. for three hours with constant stirring. A clear, pale yellow, hard, brittle resin is obtained which is soluble in alcohol, cold benzene and toluene. It is insoluble in petroleum naphtha and in linseed oil. This reaction may also be carried out in boiling xylene or tetralin.

The 5-ter.octyl-2-hydroxybenzyl-N-dimethylamine used is a crystalline solid, M. P. 69° C., obtainable by heating equimolecular proportions of formaldehyde, dimethylamine, and p-$\alpha,\alpha,\gamma,\gamma$-tetramethylbutylphenol at 90° C. for three hours.

Example 5

A mixture of 148 parts of phthalic anhydride and 193 parts of o-hydroxybenzyl-N-morpholine is heated at 130–135° C. for three hours with stirring. The product is a hard, brittle, amber-colored resin which is soluble in alcohol.

Example 6

A mixture of 148 parts of phthalic anhydride and 277 parts of 1-($\alpha$-dimethylaminobenzyl)-2-naphthol is heated at 150–160° C. for three hours with stirring in an atmosphere of carbon dioxide. The product is a hard, brittle, amber-colored resin.

Example 7

A mixture of 100 parts of succinic anhydride and 317 parts of 1-($\alpha$-piperidino-benzyl)-2-naphthol yields a brittle, amber-colored resin when heated for three hours at 140–150° C.

Example 8

A mixture of 113 parts of o-hydroxybenzyl-N-dimethylamine and 300 parts of maleic anhydride-abietic acid adduct (crystalline) is heated for three hours at 135° C. The product is a hard, brittle resin soluble in alcohol.

Example 9

A mixture consisting of 29.6 g. of phthalic anhydride and 22.8 g. of 3,5,3',5'-tetra-(dimethylaminomethyl)-4,4'-dihydroxydiphenyl-$\beta$-propane

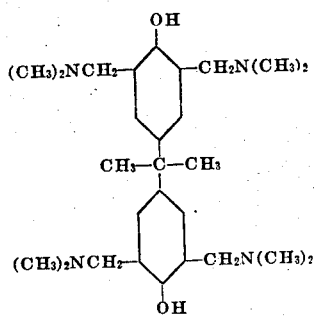

(a crystalline compound melting at 82–83° C., obtainable by condensing four mols each of formaldehyde and dimethylamine with one mol of p,p'-dihydroxydiphenyl-$\beta$-propane) is heated at 130–140° C. with stirring. A clear, pale yellow, hard, brittle resin is obtained after about 15 minutes heating. On further heating, the resin becomes insoluble in dilute acids, alkalies, and organic solvents.

Example 10

A mixture consisting of 14.8 g. of phthalic anhydride and 28.5 g. of 3-(dimethylaminomethyl)-4,4'-dihydroxydiphenyl-$\beta$-propane

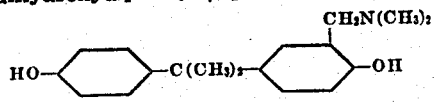

(obtainable by condensing one molecular equivalent each of formaldehyde, dimethylamine and p,p'-dihydroxydiphenyl-$\beta$-propane at 90° C.) is heated during 15 minutes to 150° C. and held there for two hours. A hard, pale amber-colored resin is obtained. It melts at 85–90° C. and is soluble in alcohol. It may be used as a shellac substitute. On heating for an additional 30 minutes at 185° C. this resin becomes insoluble in ordinary organic solvents. It is a pale amber-colored, hard, transparent, vitreous mass which becomes rubbery when hot. By using 28.5 g. of sebacic anhydride in place of phthalic anhydride and heating as above, a very tough, hard resin may be obtained. This resin is insoluble in the ordinary organic solvents.

Example 11

The maleic anhydride adduct of methyl abietate was prepared by heating 31.6 g. of methyl abietate with 9.8 g. of maleic anhydride at 175° C. for one hour. 28.5 g. of 3-(dimethylaminomethyl)-4,4'-dihydroxydiphenyl-$\beta$-propane is added to the crude adduct thus obtained and the mixture heated at 140–150° C. for three hours in an atmosphere of carbon dioxide while being stirred. The product is a pale amber-colored, hard, brittle resin. It is soluble in a 1:1 mixture of alcohol and benzene or in glycol monoethyl ether.

Example 12

A mixture consisting of 30.7 parts of 3-(dimethylaminomethyl)-4,4'-dihydroxydiphenylsulfone

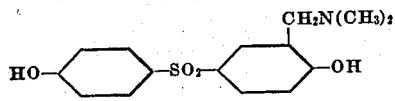

and 14.8 parts of phthalic anhydride is heated at 145–155° C. for one and one-half hours in an atmosphere of carbon dioxide while being stirred constantly. The product is an extremely pale, hard resin. An alcoholic solution of this resin deposits a hard, glossy film on evaporation of the solvent.

The sulfone used in this example may be prepared as follows:

A mixture of 250 g. of 4,4'-dihydroxydiphenylsulfone and 180 g. of aqueous 25% dimethylamine solution was cooled while 100 g. of aqueous 30% formaldehyde solution was added. This mixture was stirred and heated under a reflux condenser for three hours at 90–95° C. The oily layer was then separated while hot and washed thoroughly with hot water. After drying under reduced pressure at 80–90° C. the product was obtained as a hard solid consisting essentially of 3-(dimethylaminomethyl)-4,4'-dihydroxydiphenylsulfone.

Example 13

A mixture consisting of 25.5 parts of 3-(dimethylaminomethyl)-4-hydroxybenzophenone

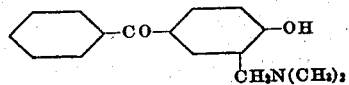

and 15.4 parts of hexahydrophthalic anhydride is heated at 150–155° C. for two hours while stirring constantly. The product is a pale reddish, hard, brittle resin.

*Example 14*

A mixture of 285 parts of 3-(dimethylaminomethyl)-4,4'-dihydroxydiphenyl-β-propane, 207 parts of 4-ter.butyl-2-dimethylaminomethylphenol, and 296 parts of phthalic anhydride was heated at 140–150° C. for three hours. The product is a pale amber, hard, brittle resin, melting at 90–95° C., and being soluble in alcohol.

*Example 15*

A mixture of 49.8 parts of o-dimethylamino-methyl-p-ter. butylphenyl acetate

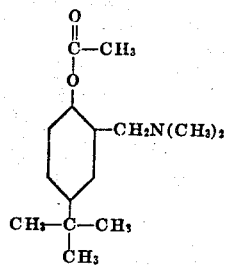

and 29.6 parts of phthalic anhydride is heated in an atmosphere of carbon dioxide at 145–153° C. for two hours and forty minutes. A pale amber, brittle resin, soluble in alcohol and in toluol, is obtained.

*Example 16*

A mixture consisting of 14.8 g. of phthalic anhydride and 31.1 g. of 2-(dimethylaminomethyl)-4-ter.butylphenyl benzoate is heated for 4–5 hours at 150–155° C. in an atmosphere of carbon dioxide while being stirred. A pale amber-colored, tough resin is obtained.

*Example 17*

14.8 g. of phthalic anhydride is heated at 150° C. with 23.4 g. of the sebacic acid ester of 2-(dimethylaminomethyl)-phenol having the formula

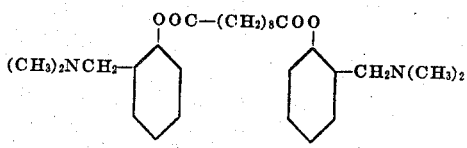

After two hours' heating, a soft, tough, pale-amber colored resin is obtained.

*Example 18*

A mixture consisting of 14.8 g. of phthalic anhydride and 62.6 g. of the monostearic acid salt of di-(dimethylaminomethyl)-4,4'-dihydroxydiphenyldimethyl methane was heated for one hour at 150–160° C. A hard, alcohol-soluble, resinous mass was obtained which, upon further heating, became rubbery and insoluble in organic solvents.

*Example 19*

A mixture of 28.4 g. of stearic acid, 14.8 g. of phthalic anhydride, 20.7 g. of 2-(dimethylaminomethyl)-4-ter.butylphenol, and 28.5 g. of 3-(dimethylaminomethyl)-4,4'-dihydroxydiphenyl-dimethyl methane was heated for 2 hours at 140–145° C. An amber-colored, hard, resinous wax was obtained which was soluble in alcohol.

The products obtained from the reaction between the tertiary aminomethyl phenol and the anhydride of a polycarboxylic acid are resinous substances which resemble shellac in many respects. They may be used in the preparation of spirit varnishes, inks, and enamels. They are in many cases thermoplastic and, hence, can be used for molding, laminating, and as adhesives. The hardness, solubility, and fusibility can be varied considerably by varying the conditions of reaction, the nature and proportions of the tertiary aminomethyl phenol and the polycarboxylic acid anhydride.

I claim:

1. The process for preparing a resin which comprises heating above 100° C. and below decomposition temperatures the anhydride of a polybasic carboxylic acid containing at least four carbon atoms with a tertiary aminomethyl phenol.

2. The process for preparing a resin which comprises heating between about 120 and about 200° C. the anhydride of a polybasic carboxylic acid containing at least four carbon atoms with a tertiary aminomethyl phenol.

3. Process for preparing a resin which comprises heating above 100° C. and below decomposition temperatures an anhydride of a polybasic carboxylic acid containing at least four carbon atoms and at least one member of the group consisting of tertiary aminomethyl phenols, their carboxylic acid salts and esters.

4. Process for preparing a resin which comprises heating above 100° C. and below decomposition temperatures an anhydride of a polybasic carboxylic acid containing at least four carbon atoms and a mixture of at least two tertiary aminomethyl phenols.

5. Process for preparing a resin which comprises heating above 100° C. and below decomposition temperatures an anhydride of a polybasic carboxylic acid containing at least four carbon atoms and a mixture consisting of a tertiary aminomethyl phenol and a carboxylic acid salt of a tertiary aminomethyl phenol.

6. The process for preparing a resin which comprises heating between about 120 and about 200° C. phthalic anhydride with a tertiary aminomethyl phenol.

7. A process for preparing a resin which comprises heating between about 120° C. and about 200° C. phthalic anhydride and 3-(dimethylaminomethyl)-4,4'-dihydroxydiphenyl-β-propane.

8. A process for preparing a resin which comprises heating between about 120 and about 200° C. phthalic anhydride and 5-ter.butyl-2-hydroxybenzyl-N-dibutylamine.

9. Process for preparing a resin which comprises heating between about 120 and about 200° C. phthalic anhydride, 2-(dimethylaminomethyl)-4-tertiary butyl phenol, 3-(dimethylaminomethyl)-4,4'-dihydroxydiphenyldimethyl methane, and stearic acid.

10. The resinous product obtained by heating above 100° C. and below decomposition temperatures the anhydride of a polycarboxylic acid containing at least four carbon atoms and tertiary aminomethyl phenol.

11. The resinous product obtained by heating between about 120 and about 200° C. the anhydride of a polybasic carboxylic acid containing at least four carbon atoms with a tertiary aminomethyl phenol.

12. The resinous product obtained by heating above 100° C. and below decomposition temperatures an anhydride of a polybasic carboxylic acid containing at least four carbon atoms and at least one member of the group consisting of tertiary aminomethyl phenols, their carboxylic acid salts and esters.

13. The resinous product obtained by heating above 100° C. and below decomposition temperatures an anhydride of a polybasic carboxylic acid containing at least four carbon atoms and a mixture of at least two tertiary aminomethyl phenols.

14. The resinous product obtained by heating between about 120 and about 200° C. phthalic anhydride and a tertiary aminomethyl phenol.

15. The resinous product obtained by heating phthalic anhydride and 3-(dimethylaminomethyl)-4,4'-dihydroxydiphenyl-β-propane.

16. The resinous product obtained by heating phthalic anhydride and 5-ter.butyl-2-hydroxybenzyl-N-dibutylamine.

17. The resinous product obtained by heating phthalic anhydride, 2-(dimethylaminomethyl)-4-tertiary butyl phenol, 3-(dimethylaminomethyl)-4,4'-dihydroxydiphenyldimethyl methane, and stearic acid.

HERMAN A. BRUSON.